(12) United States Patent
Ji et al.

(10) Patent No.: US 11,736,798 B2
(45) Date of Patent: Aug. 22, 2023

(54) METHOD FOR OBTAINING IMAGE OF THE MOON, ELECTRONIC DEVICE AND STORAGE MEDIUM

(71) Applicant: BEIJING XIAOMI MOBILE SOFTWARE CO., LTD., Beijing (CN)

(72) Inventors: Gaoping Ji, Beijing (CN); Lingyuan Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/240,096

(22) Filed: Apr. 26, 2021

(65) Prior Publication Data

US 2022/0046174 A1 Feb. 10, 2022

(30) Foreign Application Priority Data

Aug. 6, 2020 (CN) .......................... 202010784863.8

(51) Int. Cl.
*H04N 23/69* (2023.01)
*H04N 7/18* (2006.01)
*H04N 23/63* (2023.01)
*H04N 23/80* (2023.01)

(52) U.S. Cl.
CPC ............. *H04N 23/69* (2023.01); *H04N 7/18* (2013.01); *H04N 23/63* (2023.01); *H04N 23/80* (2023.01)

(58) Field of Classification Search
CPC ........... H04N 5/23296; H04N 5/23229; H04N 5/23293; H04N 7/18
See application file for complete search history.

(56) References Cited

U.S. PATENT DOCUMENTS

| | | | | |
|---|---|---|---|---|
| 8,228,413 B2 * | 7/2012 | Ellenby | ................. | G03B 17/24 |
| | | | | 348/333.02 |
| 10,863,078 B2 * | 12/2020 | Shibata | ................ | H04N 5/2353 |
| 10,893,193 B2 * | 1/2021 | Jinno | ................ | H04N 5/232945 |
| 11,158,027 B2 * | 10/2021 | Lei | ..................... | H04N 5/23296 |
| 2010/0134641 A1 * | 6/2010 | Marti | ................... | H04N 5/2624 |
| | | | | 348/222.1 |
| 2012/0069233 A1 * | 3/2012 | Nonaka | ............... | H04N 1/32128 |
| | | | | 348/333.02 |
| 2013/0188061 A1 * | 7/2013 | Ellenby | .................. | G03B 17/24 |
| | | | | 348/207.1 |
| 2016/0021303 A1 * | 1/2016 | Sutton | ................ | H04N 5/23267 |
| | | | | 348/222.1 |
| 2019/0158760 A1 * | 5/2019 | Shibata | ............ | H04N 5/232122 |
| 2021/0176395 A1 * | 6/2021 | Lu | .......................... | G06T 3/4007 |
| 2022/0351701 A1 * | 11/2022 | Xia | ........................ | G06T 5/007 |

FOREIGN PATENT DOCUMENTS

CN 109951633 A 6/2019

OTHER PUBLICATIONS

European Patent Application No. 21170835.9 extended Search and Opinion dated Oct. 19, 2021, 7 pages.

* cited by examiner

*Primary Examiner* — Boubacar Abdou Tchoussou
(74) *Attorney, Agent, or Firm* — Cozen O'Connor

(57) ABSTRACT

A method for obtaining an image of the moon includes obtaining position data of the moon in an original image and obtaining the image of the moon based on the position data and a current actual zooming multiple of a camera component, in which a central area in the image of the moon contains the moon.

12 Claims, 4 Drawing Sheets

METHOD FOR OBTAINING IMAGE OF THE MOON, ELECTRONIC DEVICE AND STORAGE MEDIUM

CROSS REFERENCE TO RELATED APPLICATION

This application claims the benefit of priority to Chinese Application No. 202010784863.8, filed on Aug. 6, 2020, the content of which is incorporated herein by reference in its entirety.

TECHNICAL FIELD

The present disclosure relates to a field of image processing technology, and particularly to a method for obtaining an image of the moon, an electronic device and a storage medium.

BACKGROUND

With development of mobile phone imaging technology, users more and more rely on a mobile phone to shoot images of various scenes, such as shooting the moon. In practical applications, when shooting the moon, the user needs to adopt high zooming multiple to make the moon large enough in imaging. However, in an unstable state such as being at a high zooming multiple, the user's slight hand shaking may make the moon move out of a preview interface, so that a satisfied image of the moon cannot be obtained.

SUMMARY

The present disclosure provides a method and an apparatus for obtaining an image of the moon, an electronic device and a storage medium, to solve the shortcomings of the related technology.

According to a first aspect of the embodiment of the present disclosure, a method for obtaining an image of the moon is provided, and includes: obtaining position data of the moon in an original image; and obtaining the image of the moon based on the position data and a current actual zooming multiple of a camera component. A central area in the image of the moon contains the moon.

According to a second aspect of the embodiment of the present disclosure, an electronic device is provided, and includes: a processor; a memory configured to store a computer program executable by the processor; in which, the processor is configured to execute a computer program in the memory, to implement a method for obtaining an image of the moon, including: obtaining position data of the moon in an original image; and obtaining the image of the moon based on the position data and a current actual zooming multiple of a camera component. A central area in the image of the moon contains the moon.

According to a third aspect of the embodiment of the present disclosure, a computer readable storage medium is provided. When the executable computer program in the storage medium is executed by the processor, a method for obtaining an image of the moon is implemented, including: obtaining position data of the moon in an original image; and obtaining the image of the moon based on the position data and a current actual zooming multiple of a camera component. A central area in the image of the moon contains the moon.

It is to be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

With development of mobile phone imaging technology, users more and more rely on a mobile phone to shoot images of various scenes, such as moon shooting. In practical applications, when shooting the moon, the user needs to adopt high zooming multiple to make the moon large enough in imaging. However, in an unstable state such as being at a high zooming multiple, the user's slight hand shaking may make the moon moved out of a preview interface, so that a satisfied image of the moon cannot be obtained.

Figure 1:
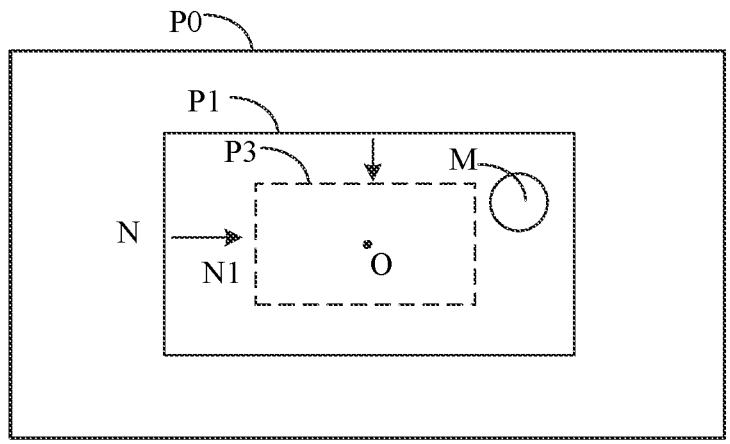
FIG. 1 is a diagram illustrating clipping an image of the moon in the related art.

In the process of implementing the solutions of the embodiments of the present disclosure, after careful analysis, it can be found that an image processor may clip an image P1 with a corresponding size from an original image P0 acquired by an image sensor, which has the same size as that of the image sensor, according to a zooming multiple N of the camera component, and then display it on a display to achieve an effect of magnifying N times, as shown in FIG. 1. However, during the above clipping process, the image processor always takes a preset position, such as a center position O, in the original image as a center position of the displayed image, such that the shooting area does not match the displayed area. With additional influence of the user's hand shaking, the moon would often be moved out of the displayed area, which degrades the shooting experience. FIG. 1 shows an example in which the moon M was moved out of the clipped area when it was zoomed in from an N multiple to an N1 multiple such that the moon could not be displayed on an preview image.

To solve the above technical problems, an embodiment of the present disclosure provides a method for obtaining an image of the moon, with a basic concept of obtaining position data of the moon in an original image; clipping the image of the moon from the original image by taking the position data as a central position in combination with the current actual zooming multiple of the camera component, in which a central area in the image of the moon contains the moon. In this way, the shooting area matches the displayed area, avoiding the moon being moved out of the displayed area, which is beneficial for improving the user's shooting experience.

Figure 2:
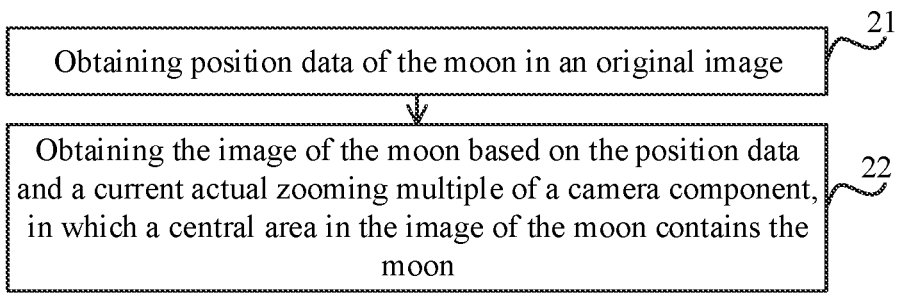
FIG. 2 is a flowchart illustrating a method for obtaining an image of the moon according to an example embodiment.

FIG. 2 is a flowchart illustrating a method for obtaining an image of the moon according to an example embodiment, which may be applied to an electronic device. The electronic device may include a smart phone, a personal computer or a server. Referring to FIG. 2, a method for obtaining an image of the moon includes blocks 21-22.

At block 21, position data of the moon in an original image is obtained.

In the embodiment, a camera component may be provided on an electronic device. When a user initiates an APP "camera" on a system interface in the electronic device, a camera component may be enabled, and may be controlled into a shooting state.

In the shooting process, the user may operate a lens of the camera component, for example, increasing or reducing a zooming multiple of the camera component by rotating clockwise or counterclockwise. In combination with a preview image on a display screen of the electronic device, the user may determine whether the size of the moon at the current actual zooming multiple is his desired size, and may adjust it until it reaches the desired size.

In an embodiment, the electronic device may store a preset image recognition algorithm, for example, a recognition algorithm implemented based on machine learning, such as a convolutional neural network, or a recognition algorithm implemented based on feature matching, such as an Oriented Fast and Rotated Brief (ORB), a scale-invariant feature transform (SIFT), etc. An appropriate image recognition algorithm may be selected as necessary and is not limited here. When it is detected that the user initiates the shooting operation, the electronic device may recognize an object, such as a person, scenery, or the moon, contained in the original image by using the above preset image recognition algorithm. Thus, when the moon is contained the original image, the position data of the moon may be obtained. The above position data may include an abscissa and an ordinate of the center position of the moon in the original image, and may alternatively or additionally include a width, a length and other data of the moon, which is not limited here.

In an embodiment, the electronic device may further determine whether the camera component meets a preset condition before determining the position data. The block 21 is performed after the preset condition is met. Here, the preset conditions may include any one of: 1) a current shooting mode being in a moon mode; and 2) being in the moon mode and the current zooming multiple of the camera component exceeding a preset threshold for the zooming multiple.

Figure 3:
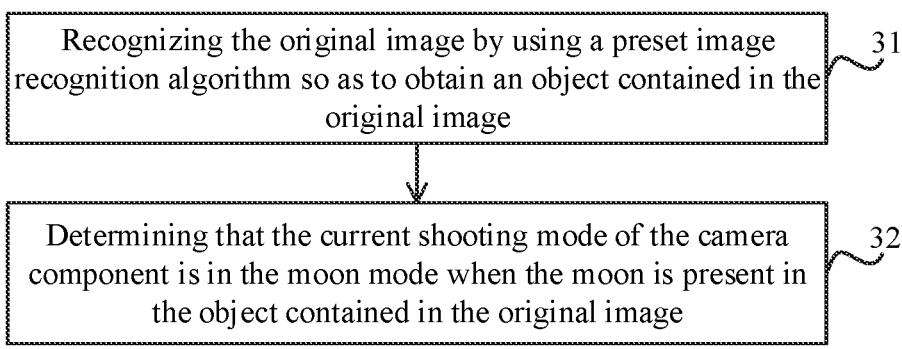
FIG. 3 is a flowchart illustrating determining a moon mode according to an example embodiment.

In an example, when the preset condition is being in the moon mode and the current zooming multiple of the camera component exceeding a preset threshold for the zooming multiple, the electronic device determines whether the camera component meets the preset conditions, and includes obtaining the current shooting mode of the camera component by the electronic device. For example, referring to FIG. 3, at block 31, the electronic device may recognize an original image by using a preset image recognition algorithm to obtain an object contained in the original image. At block 32, when the moon is present in an object contained in the original image, the current shooting mode of the camera component is determined as the moon mode. When the moon is not present in the original image, the current shooting mode may be determined according to the light in the current scene or a historical shooting mode before the camera component is enabled. The electronic device may determine that the camera component meets the preset condition when the current shooting mode of the camera component is in the moon mode. Otherwise, it is determined that the preset condition is not met, in which the shooting operation may be performed according to the current shooting mode. For another example, the current shooting mode of the camera component may be obtained by reading a shooting mode indicator with a value of 1 and using a shooting mode corresponding to the shooting mode indicator as the current shooting mode. The above shooting mode may be a moon mode, a portrait mode, a night view mode, or the like. When the user adjusts the shooting mode of the camera component to a certain mode, the shooting mode indicator of the mode is set to be 1.

Figure 4:
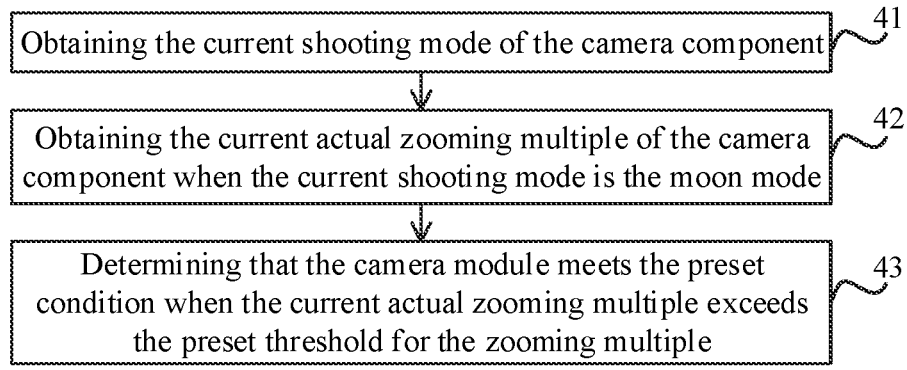
FIG. 4 is a flowchart illustrating determining to meet a preset condition according to an example embodiment.

In another example, when the preset condition is the current shooting mode being in the moon mode, the electronic device may determine whether the camera component meets the preset condition, and, as shown in FIG. 4, includes obtaining the current shooting mode of the camera component by the electronic device, at block 41. The step of determining the shooting mode may be implemented with reference to the previous description. At block 42, when the current shooting mode is the moon mode, the current actual zooming multiple of the camera component is obtained. At block 43, when the current actual zooming multiple exceeds the preset threshold for the zooming multiple, it may be determined that the camera component meets the preset condition, and the block 21 may be performed. Otherwise, it is determined that the preset condition is not met, in which the shooting operation may be performed according to the current shooting mode.

The above preset threshold for the zooming multiple may be determined according to critical zooming multiples of at least two lenses in the camera component. For example, assuming that a zooming multiple of a wide-angle lens is 1.0-3.0, and a zooming multiple of a telephoto lens is 3.0-5.0, the preset threshold for the zooming multiple may be set to be 3.0. Of course, the above preset threshold for the zooming multiple may alternatively be determined via Big Data, by gathering statistics for zooming multiples of various camera components and respective effects of moon shooting. For example, a zooming multiple corresponding to the best shooting effect may be taken as the preset threshold for the zooming multiple. It is understandable that various methods for setting the preset threshold for the zooming multiple that allow to improve the quality of captured images of the moon, may fall within the extent of the disclosure. In the example, the value of the preset threshold for the zooming multiple may range from 3.0 to 5.0.

It is to be noted that, in the embodiment, setting the preset threshold for the zooming multiple may prevent the quality of captured images of the moon from being influenced by a zooming multiple that is too large or the user's shaking, and reduce the computation amount for the electronic device to process the data.

Figure 5:
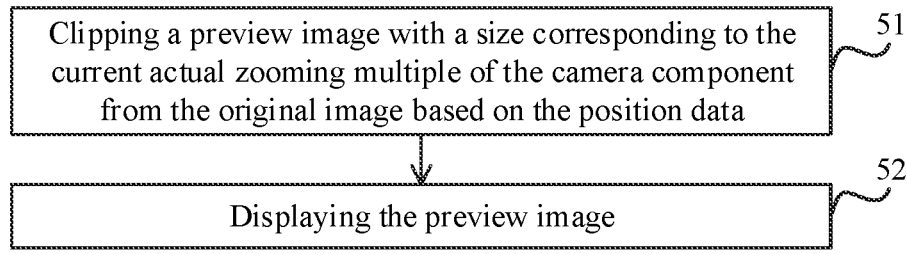
FIG. 5 is a flowchart illustrating displaying a preview image according to an example embodiment.

In an embodiment, referring to FIG. 5, at block 51, after the electronic device obtains the position data, a preview image with a size corresponding to the current actual zooming multiple may be clipped from the original image. At block 52, the electronic device may control a display screen to display the above preview image, so that the user may review the captured image in time.

At block 22, the image of the moon is obtained based on the position data and the current actual zooming multiple of the camera component, in which a central area in the image of the moon contains the moon.

Figure 6:
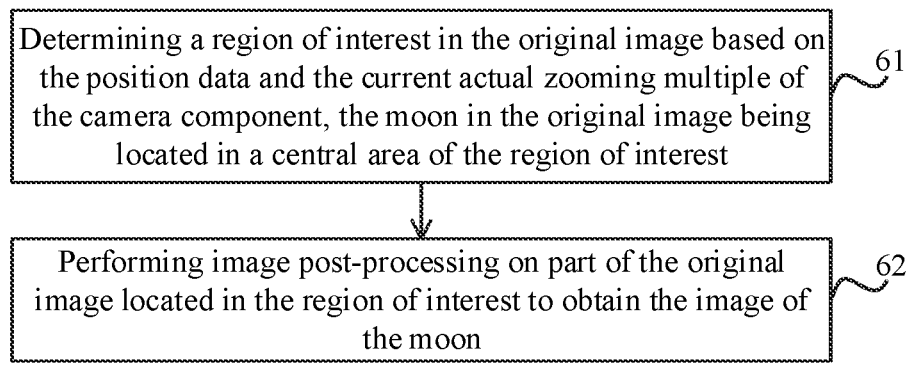
FIG. 6 is a flowchart illustrating obtaining the image of the moon according to an example embodiment.
Figure 7:
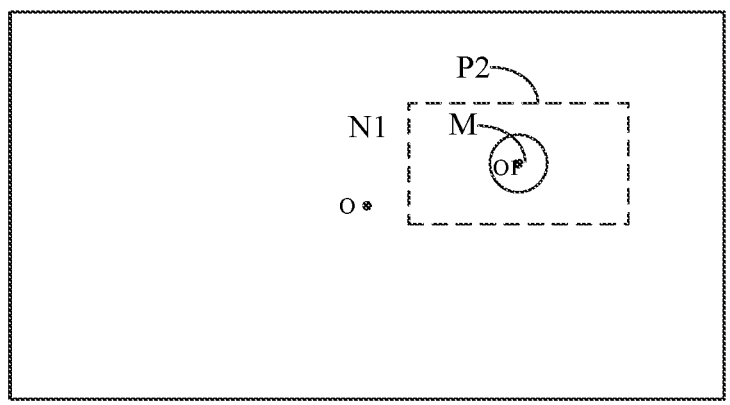
FIG. 7 is a diagram illustrating clipping the image of the moon according to an example embodiment.

In the embodiment, the electronic device may determine the image of the moon based on the position data of the moon and the current actual zooming multiple of the camera component, and as shown in FIG. 6, includes determining a region of interest in the original image based on the position data and the current actual zooming multiple of the camera component by the electronic device, at block 61, which is illustrated at a region P2 in FIG. 7. The moon in the original image is located in a central area of the region of interest, with a central position O1 of the moon overlapping with the central position of the region of interest. At block 62, the electronic device may perform an image post-processing, such as automatic focusing, automatic white balance, automatic exposure, or the like, on part of the original image located in the region of interest, to obtain the image of the moon.

Consequently, according to the embodiments of the present disclosure, the image of the moon may be obtained according to the position data and the current actual zooming multiple of the camera component by obtaining the position data of the moon in the original image, with the moon located in the central position of the image of the moon. In this way, the shooting area may match the displayed area, avoiding the moon being moved out of the displayed area at a high focal length, which is beneficial for improving the user's shooting experience.

An implementation of the above method for obtaining the image of the moon will be described below in an embodiment in which a user intends to take an image of the moon with a mobile phone, including the following steps.

When the user uses a camera function of the mobile phone and starts the moon mode, or the camera function automatically switches to the moon mode, the following function may be enabled: disabling the processor for outputting an image with a higher zooming multiple when it is detected that the user has adjusted the current actual zooming multiple of the camera component to a zooming multiple exceeding the preset threshold for the zooming multiple, such that any zooming multiple set by the user beyond the threshold will no longer make ISP increase the zooming multiple of the output image.

The original image is subjected to a preset moon mode algorithm so as to recognize position data of the moon in the original image. Also, the moon mode algorithm clips an image corresponding to the current actual zooming multiple, i.e. a preview image, from the original image by takes the above position data as a center position and controls the display screen to display the preview image.

The moon mode algorithm may further subject the above position data and the original image to a preset 3A algorithm, which performs an image post-processing on an input image, such as automatic focusing, automatic white balance, automatic exposure, or the like.

The 3A algorithm defines a region of interest (ROI) in the original image according to the position data of the moon in the original image determined by the moon mode algorithm, and then performs a 3A processing on part of the image in the ROI area to obtain an image of the moon with the moon located in the center area. That is, in the embodiment, the moon is always treated as the ROI, resulting in images with stable parameters and high quality imaging of the moon.

Figure 8:
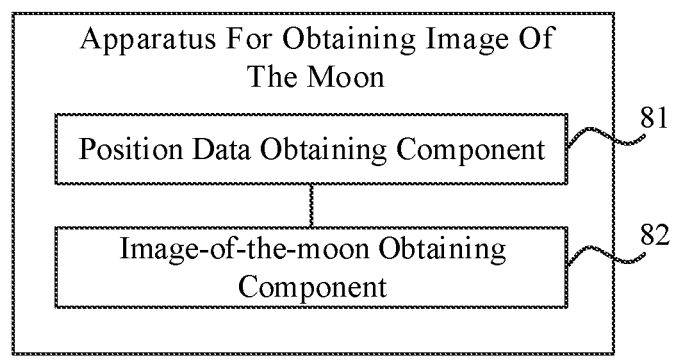
FIG. 8 is a block diagram illustrating an apparatus for obtaining an image of the moon according to an example embodiment.

On the basis of the above method for obtaining an image of the moon, the embodiments of the present disclosure further provides an apparatus for obtaining an image of the moon, referring to FIG. 8, and includes: a position data obtaining component 81 configured to obtain position data of the moon in an original image; and an image-of-the-moon obtaining component 82 configured to obtain the image of the moon based on the position data and the current actual zooming multiple of a camera component, in which a central area in the image of the moon contains the moon.

In an embodiment, the image-of-the-moon obtaining component 82 includes: a region obtaining unit configured to determine a region of interest of the original image based on the position data and the current actual zooming multiple of a camera component, in which the moon in the original image is located in a central area of the region of interest; and an image obtaining unit configured to perform an image post-processing on part of the original image located in the region of interest to obtain the image of the moon.

In an embodiment, the apparatus further includes: a condition determining component configured to determine that the camera component meets a preset condition, the preset condition including any one of: 1) a current shooting mode being in a moon mode; and 2) being in the moon mode and the current zooming multiple of the camera component exceeding a preset threshold for the zooming multiple.

In an embodiment, when the preset condition is being in the moon mode and the current zooming multiple of the camera component exceeding the preset threshold for the zooming multiple, the condition determining component includes: a mode obtaining unit configured to obtain the current shooting mode of the camera component; a multiple obtaining unit configured to obtain the current actual zooming multiple of the camera component when the current shooting mode is the moon mode; and a condition determining unit configured to determine that the camera component meets the preset condition when the current actual zooming multiple exceeds the preset threshold for the zooming multiple.

In an embodiment, the mode obtaining unit includes: an object obtaining subunit configured to recognize the original image by using a preset image recognition algorithm, to obtain the object contained in the original image; and a mode determining subunit configured to determine that the current shooting mode of the camera component is in the moon mode when the moon is present in the object contained in the original image.

In an embodiment, the apparatus further includes: an image clipping component configured to clip a preview image with a size corresponding to the current actual zooming multiple of the camera component from the original image based on the position data; and an image displaying component configured to display the preview image.

It is understandable that the apparatus provided in the embodiment of the present disclosure corresponds to the above method, therefore, the contents may refer to the contents of the embodiments of the method, which will not be repeated here.

Figure 9:
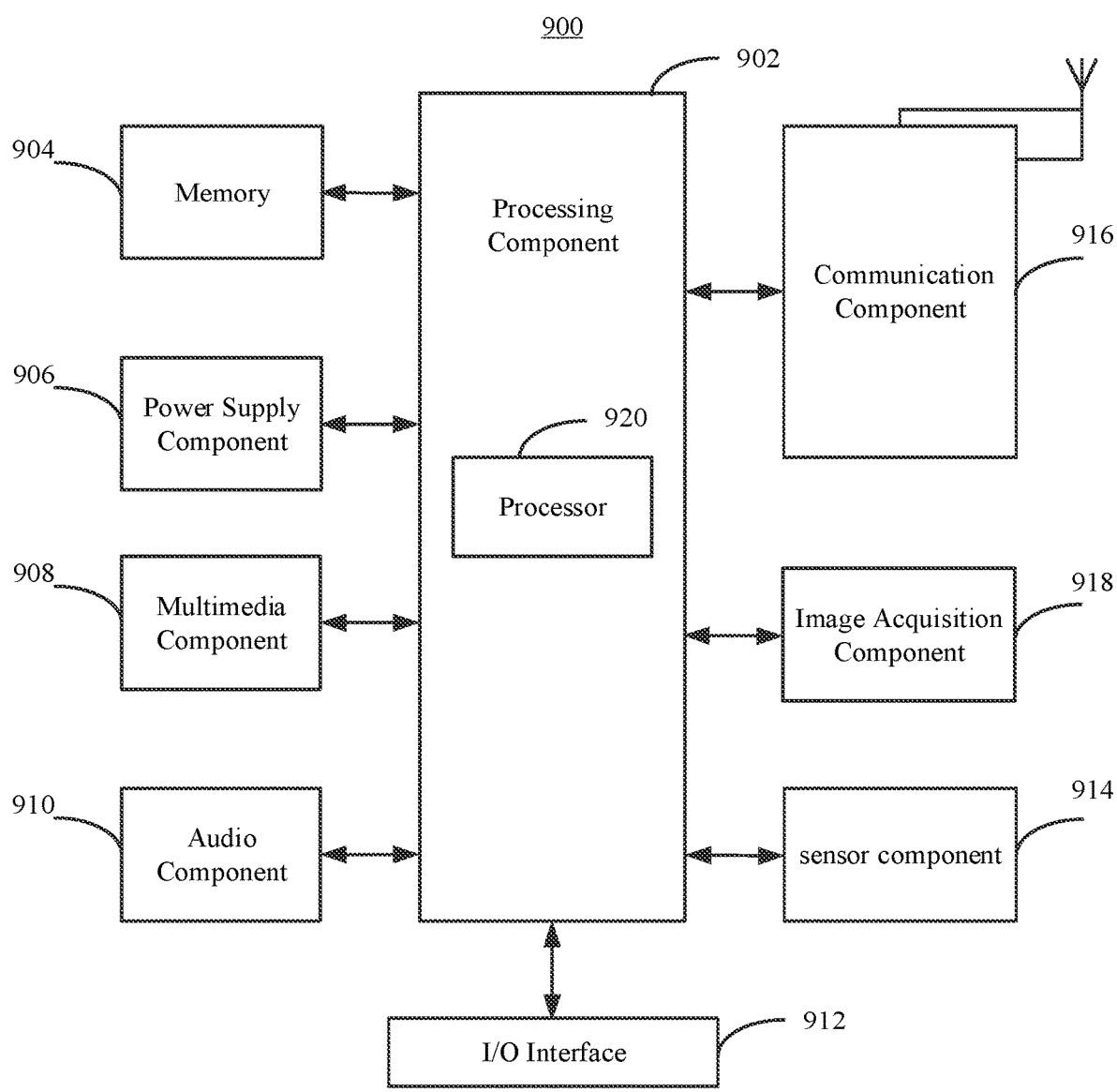
FIG. 9 is a block diagram illustrating an electronic device according to an example embodiment.

FIG. 9 is a block diagram illustrating an electronic device according to an example embodiment. For example, an electronic device 900 may be a smart phone, a computer, a digital broadcasting terminal, a tablet device, a medical equipment, a fitness equipment, a personal digital assistant, etc.

Referring to FIG. 9, the electronic device 900 may include one or more components: a processing component 902, a memory 904, a power supply component 906, a multimedia component 908, an audio component 910, an input/output (I/O) interface 912, a sensor component 914, a communication component 916, and an image collection component 918.

The processing component 902 generally controls the whole operation of the electronic device 900, such as the operations related to display, phone call, data communication, camera operation and recording operation. The processing component 902 may include one or more processors 920 to execute a computer program. In addition, the processing component 902 may include one or more components for the convenience of interaction between the processing component 902 and other components. For example, the processing component 902 may include a multimedia component for the convenience of interaction between the multimedia component 908 and the processing component 902.

The memory 904 is configured to store all types of data to support the operation of the electronic device 900. Examples of the data include computer programs of any applications or methods operated on the electronic device 900, contact data, phone book data, messages, pictures, videos, etc. The memory 904 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 906 may provide power for all components of the electronic device 900. The power supply component 906 may include power supply management system, a or more power supplies, and other units related to generating, managing and distributing power for the electronic device 900. The power supply component 906 may include a power supply chip, and the controller may communicate with a power supply chip, thereby controlling the power supply chip to conduct or disconnect a switch element, so that a battery supplies power or does not supply power to a main board circuit.

The multimedia component 908 includes an output interface screen provided between the electronic device 900 and the target object. In some embodiments, a screen may include a liquid crystal display (LCD) and a touch panel (TP). If the screen includes a touch panel, the screen may be implemented as a touch screen to receive an input signal from the target object. The touch panel includes one or more touch sensors to sense touching, sliding and gestures on the touch panel. The touch sensor may not only sense the boundary of touch or slide action, but also detect the duration and pressure related to the touching or sliding operation.

The audio component 910 is configured as output and/or input signal. For example, the audio component 910 includes a microphone (MIC). When the electronic device 900 is in operation mode, such as call mode, record mode, and speech recognition mode, the microphone is configured to receive the external audio signals. The audio signals received may be further stored in the memory 904 or sent via the communication component 916. In some embodiments, the audio component 910 further includes a speaker configured to an output audio signal.

The I/O interface 912 provides an interface for the processing component 902 and the peripheral interface component, and the peripheral interface component may be a keyboard, a click wheel, a button, etc.

The sensor component 914 includes one or more sensors, configured to provide various aspects of status assessment for the electronic device 900. For example, the sensor component 914 may detect the on/off state of the electronic device 900 and the relative positioning of the component. For example, the component is a display screen and a keypad of the electronic device 900. The sensor component 914 may further detect the location change of the electronic device 900 or one component of the electronic device 900, the presence or absence of contact between the user and the device 900, the orientation or acceleration/deceleration of the device 900, and the temperature change of the device 1300.

The communication component 916 is configured for the convenience of wire or wireless communication between the electronic device 900 and other devices. The electronic device 900 may access wireless networks based on communication standard, such as WiFi, 2G, 3G, 4G, 5G, or their combination. In an exemplary embodiment, the communication component 916 receives broadcast signals or broadcast-related information from an external broadcast management system via a broadcast channel. In an exemplary embodiment, the communication component 916 further includes a near field communication (NFC) component to facilitate short-range communication. For example, an NFC component may be implemented based on radio frequency indicator (RFID) technology, infrared data association (IRDA) technology, ultra-wideband (UWB) technology, bluetooth (BT) technology and other technologies.

In an exemplary embodiment, the electronic device 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components.

In an exemplary embodiment, a non-temporary computer readable storage medium including an executable computer program is further provided, such as a memory 904 including instructions, in which the executable computer program may be executed by a processor. In which, a computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims.

The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims. It should be understood that the present invention is not limited to the precise structure described above and shown in the drawings, and various modifications and changes may be made without departing from its scope. The scope of the present application is only limited by the appended claims.

What is claimed is:

1. A method for obtaining an image of the moon, comprising:
   obtaining position data of the moon in an original image;
   in response to the moon being not located in a central position of the original image, clipping a preview image with a size corresponding to a current actual zooming multiple of a camera component from the original image by taking the position data as a central position of the preview image;
   displaying the preview image, in which the moon is located in the central position of the preview image;
   determining a region of interest in the original image based on the position data and the current actual zooming multiple, wherein a central position of the region of interest is overlapped with a central position of the moon, and a size of the region of interest corresponds to the current actual zooming multiple; and
   obtaining an image of the moon by performing image post-processing on a part of the original image located in the region of interest.

2. The method for obtaining the image of the moon according to claim 1, further comprising:
   determining whether the camera component meets a preset condition, the preset condition comprising any one of:
   1) A current shooting mode being in a moon mode; and
   2) being in the moon mode and the current actual zooming multiple of the camera component exceeding a preset threshold for the zooming multiple.

3. The method for obtaining the image of the moon according to claim 2, wherein, when the preset condition is being in the moon mode and the current actual zooming multiple of the camera component exceeding the preset threshold for the zooming multiple, determining whether the camera component meets the preset condition comprises:
   obtaining the current shooting mode of the camera component;
   obtaining the current actual zooming multiple of the camera component when the current shooting mode is the moon mode; and
   determining that the camera component meets the preset condition when the current actual zooming multiple exceeds the preset threshold for the zooming multiple.

4. The method for obtaining the image of the moon according to claim 3, wherein obtaining the current shooting mode of the camera component comprises:
   recognizing the original image by using a preset image recognition algorithm so as to obtain an object contained in the original image; and
   determining that the current shooting mode of the camera component is in the moon mode when the moon is present in the object contained in the original image.

5. An electronic device, comprising:
   a processor;
   a memory for storing instructions executable by the processor, wherein the processor is configured to:
   obtain position data of the moon in an original image;
   in response to the moon being not located in a central position of the original image, clip a preview image with a size corresponding to a current actual zooming multiple of a camera component from the original image by taking the position data as a central position of the preview image;
   display the preview image, in which the moon is located in the central position of the preview image;
   determine a region of interest in the original image based on the position data and the current actual zooming multiple, wherein a central position of the region of interest is overlapped with a central position of the moon, and a size of the region of interest corresponds to the current actual zooming multiple; and
   obtain an image of the moon by performing image post-processing on a part of the original image located in the region of interest.

6. The electronic device according to claim 5, wherein the processor is further configured to:
   determine that the camera component meets a preset condition, the preset condition comprising any one of:
   1) A current shooting mode being in a moon mode; and
   2) being in the moon mode and the current actual zooming multiple of the camera component exceeding a preset threshold for the zooming multiple.

7. The electronic device according to claim 6, wherein when the preset condition is being in the moon mode and the current actual zooming multiple of the camera component exceeding a preset threshold for the zooming multiple, the processor is further configured to:
   obtain the current shooting mode of the camera component;
   obtain the current actual zooming multiple of the camera component when the current shooting mode is the moon mode; and
   determine whether the camera component meets the preset condition when the current actual zooming multiple exceeds the preset threshold for the zooming multiple.

8. The electronic device according to claim 7, wherein the processor is further configured to:
   recognize the original image by using a preset image recognition algorithm so as to obtain an object contained in the original image; and
   determine that the current shooting mode of the camera component is in the moon mode when the moon is present in the object contained in the original image.

9. A non-transitory computer-readable storage medium having stored thereon instructions that, when executed by a processor of an electronic device, cause the electronic device to perform a method for obtaining an image of the moon, comprising:
   obtaining position data of the moon in an original image;
   in response to the moon being not located in a central position of the original image, clipping a preview image with a size corresponding to a current actual zooming multiple of a camera component from the original image by taking the position data as a central position of the preview image;

displaying the preview image, in which the moon is located in the central position of the preview image;

determining a region of interest in the original image based on the position data and the current actual zooming multiple, wherein a central position of the region of interest is overlapped with a central position of the moon, and a size of the region of interest corresponds to the current actual zooming multiple; and obtaining an image of the moon by performing image post-processing on a part of the original image located in the region of interest.

10. The non-transitory computer-readable storage medium according to claim 9, further comprising:

determining whether the camera component meets a preset condition, the preset condition comprising any one of:

1) A current shooting mode being in a moon mode; and
2) being in the moon mode and the current actual zooming multiple of the camera component exceeding a preset threshold for the zooming multiple.

11. The non-transitory computer-readable storage medium according to claim 10, wherein, when the preset condition is in the moon mode and the current actual zooming multiple of the camera component exceeds the preset threshold for the zooming multiple, determining whether the camera component meets the preset condition comprises:

obtaining the current shooting mode of the camera component;

obtaining the current actual zooming multiple of the camera component when the current shooting mode is the moon mode; and determining that the camera component meets the preset condition when the current actual zooming multiple exceeds the preset threshold for the zooming multiple.

12. The non-transitory computer-readable storage medium according to claim 11, wherein obtaining the current shooting mode of the camera component comprises:

recognizing the original image by using a preset image recognition algorithm so as to obtain an object contained in the original image; and determining that the current shooting mode of the camera component is in the moon mode when the moon is present in the object contained in the original image.

* * * * *